United States Patent [19]
Balkwill

[11] 4,121,920
[45] Oct. 24, 1978

[54] GLASS FIBER DRAWING MACHINE

[75] Inventor: John T. Balkwill, Saugus, Calif.

[73] Assignee: International Telephone & Telegraph Corp., Nutley, N.J.

[21] Appl. No.: 32,498

[22] Filed: Apr. 6, 1970

[51] Int. Cl.$^2$ .................. C03B 23/04; C03B 37/02
[52] U.S. Cl. ................................ 65/13; 65/4 A; 65/271
[58] Field of Search .................. 65/12, 271, 269, 102, 65/244, 268, 354, 13; 72/286

[56] References Cited

U.S. PATENT DOCUMENTS

| | | | |
|---|---|---|---|
| 2,050,088 | 8/1936 | Dichter | 65/271 |
| 2,490,252 | 12/1949 | Brewer | 65/271 |
| 3,019,558 | 2/1962 | Broadbent et al. | 65/271 |
| 3,589,793 | 6/1971 | Curtiss | 350/96.24 |

Primary Examiner—Richard D. Lovering
Attorney, Agent, or Firm—John T. O'Halloran

[57] ABSTRACT

A glass drawing machine which has a movable oven that permits glass fibers to be drawn to size within a tolerance of ± 0.00025 inch.

3 Claims, 12 Drawing Figures

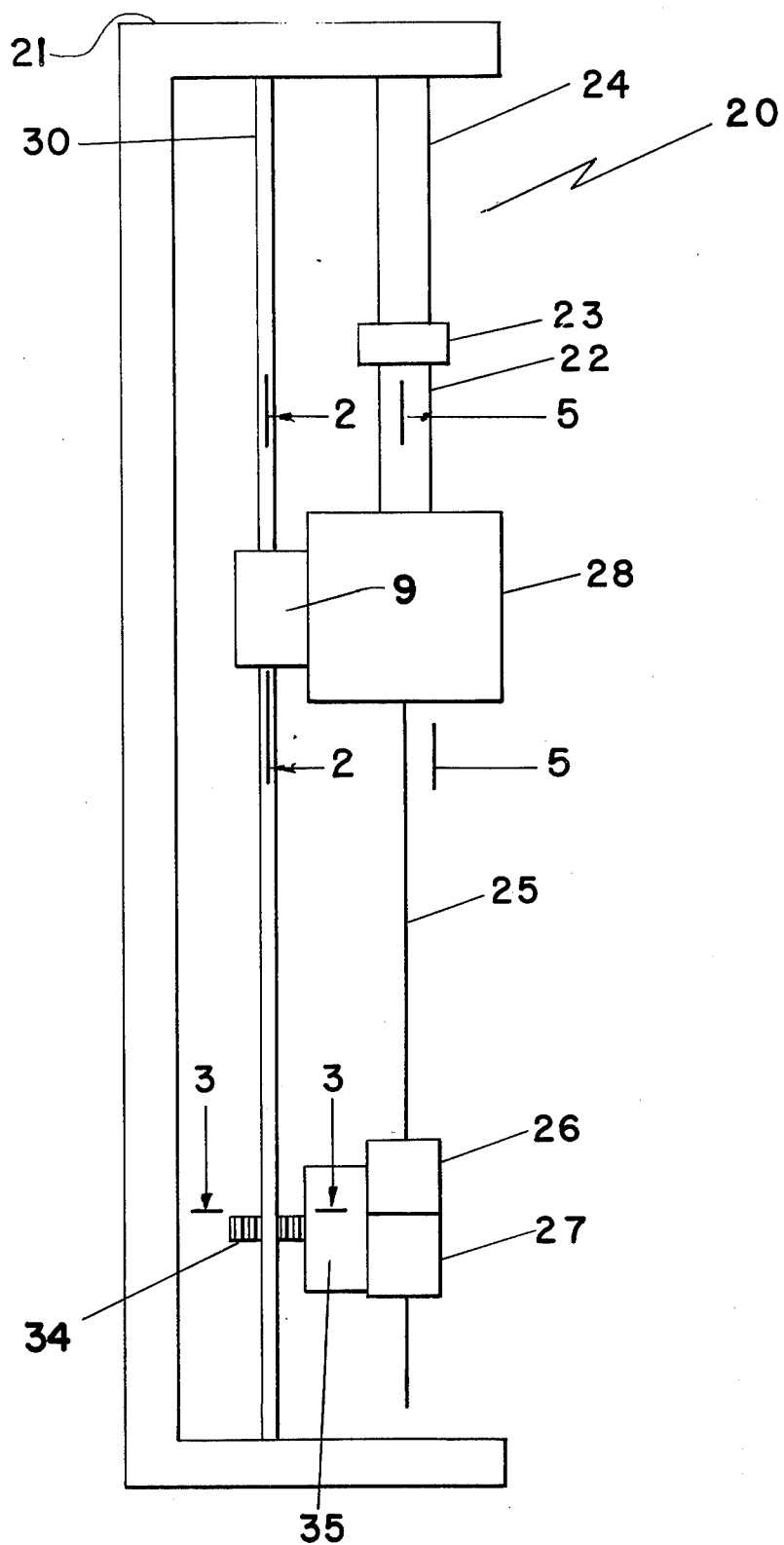
FIG. 1

GLASS FIBER DRAWING MACHINE

BACKGROUND OF THE INVENTION

This invention relates to the glass drawing art and, more particularly, to a machine and method for drawing out glass fibers of a uniform diameter. In the past, glass has been drawn in a machine which supports glass stock vertically from a cable or the like. A motor drive then lengthens the cable from a drum, and the stock is lowered into an oven. When the stock is heated, a glass fiber is drawn from it at a point below the oven. The oven is, thus usually a hollow cylinder, open at both ends.

In the prior art, attempts have been made to lower the glass stock into the oven at a constant velocity. This, in turn, causes diameter variations in the drawn glass. In the first place, the stock is suspended like a pendulum. Therefore, it sways to and fro. The cable also vibrates. The stock support does have guides, but the bracket holding the stock hangs up on the guides. The lowering process does not give the lowering motor a positive, constant load to work against. The stock is, thus, lowered in jerky movements. The cable is elastic and causes the stock to bounce. Further, the cable movement around the drums and pulleys is not and cannot be positively guided. Due to the extremely low velocity of the stock and the accuracy desired, a long gear train must be employed. Any shift in any gear can and does cause jerky stock movement because the motor is not working into a highly positive and sustained load.

The above-described prior art glass machine has some utility, but the glass fiber product thereof is nonuniform in the diameter along its length. In particular, its diameter runs true only within the limits of ±0.001 inch. This inaccuracy is a substantial source of difficulty because within the tolerance noted, much of the production of the machine is unusable.

SUMMARY OF THE INVENTION

In accordance with the present invention, the above-described and other disadvantages of the prior art are overcome by employing a movable oven and lifting the oven around the glass stock. The stock is, thus, held rigid against movement. The oven is relatively heavy and is guided in its upward travel. The movement is preferably produced by a lead screw. Since the oven is fairly heavy and is moved upwardly, the entire driving mechanism including motor, gear train, and lead screw all have a substantial loading which is sustained or continuous without gaps of no load or reduced load. For this reason, it is possible to obtain glass fibers of a diameter which is uniform within extremely small tolerances. That is, glass may be drawn to size within a tolerance of ±0.00025 inch. This provides a reduction in the tolerance which could be maintained in the prior art of 75 percent.

The above-described and other advantages of the invention will be better understood from the following description when considered in connection with the accompanying drawings.

BRIEF DESCRIPTION OF THE DRAWINGS

In the drawings, which are to be regarded as merely illustrative:

FIG. 1 is a side elevational view of a glass drawing machine constructed in accordance with the present invention;

DESCRIPTION OF THE PREFERRED EMBODIMENT

Figure 5:
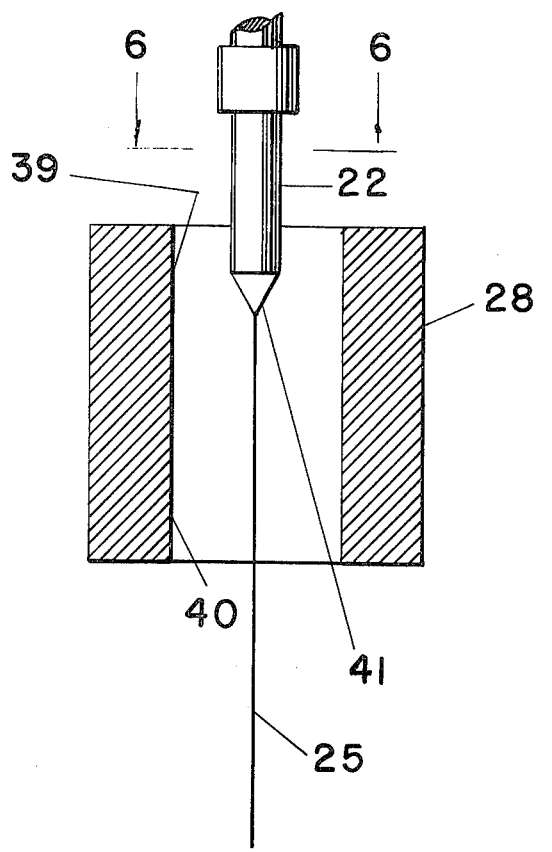
FIG. 5 is a vertical sectional view of an oven taken on the line 5—5 shown in FIG. 1.

A glass drawing machine 20 is shown in FIG. 1 including frame 21. Glass stock 22 is supported rigidly on frame 21 by a conventional chuck 23 and a member 24 fixed thereto. Glass is drawn from stock 22 at 25 by a device 26 which is driven by a constant speed motor 27. An oven 28 heats glass stock 22. Oven 28 is fixed to a bracket 29. Oven 28 may otherwise be entirely conventional.

Figure 2:
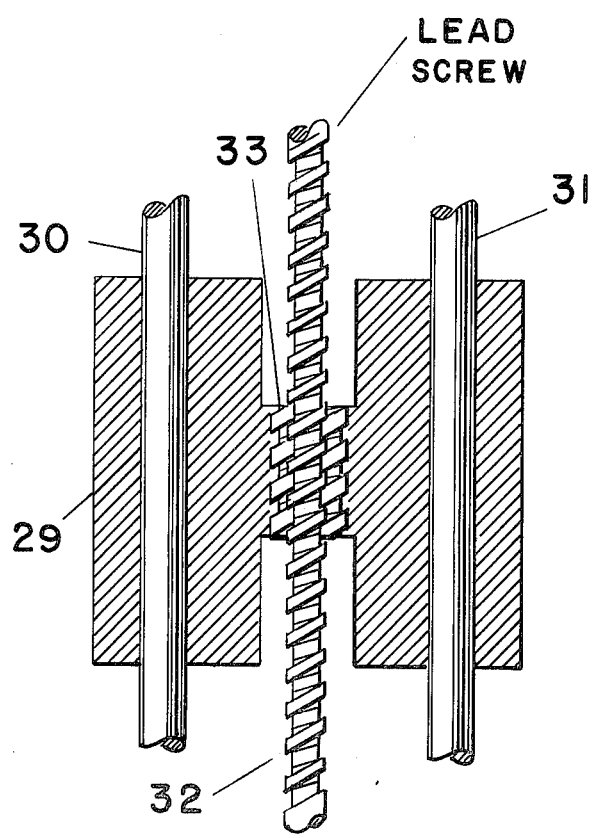
FIG. 2 is a vertical sectional view of the machine shown in FIG. 1 taken on the line 2—2.

Bracket 29 slides upwardly and downwardly on guide rods 30 and 31 as shown in FIG. 2. Guide rods 30 and 31 are fixed at their ends to frame 21. A lead screw 32 shown in FIG. 2 is rotatably mounted in frame 21 and extends vertically thereinto. Bracket 29 has threaded hole 33 through which lead screw 32 is threaded.

Lead screw 32 has a worm gear 34 fixed thereto as shown in FIG. 1. Assembly 35, including a constant speed motor, a gear train, and a worm 36 to mesh with worm gear 34 which rotates lead screw 32 at a constant velocity.

Motor 27 and device 26 may be entirely conventional.

Figure 3:
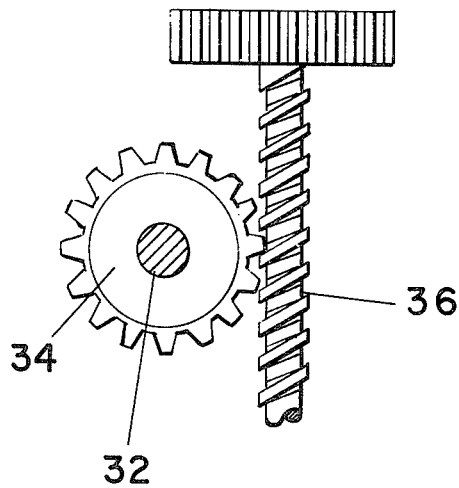
FIG. 3 is a horizontal sectional view of the machine shown in FIG. 1 taken on the line 3—3.

As shown in FIG. 3, gear 34, fixed to lead screw 32 is in mesh with worm 36.

Figure 4:
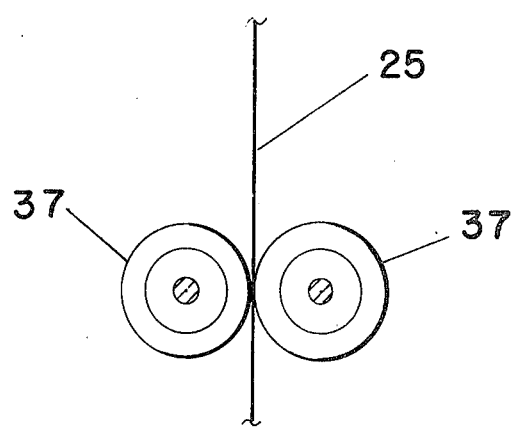
FIG. 4 is a front elevational view of glass drawing means shown in FIG. 1.

As shown in FIG. 4, glass at 25 is drawn between a pair of pressure rolls 37 and 38 which are driven by motor 27.

As is conventional, maximum heating of conventional oven 28 may take place approximately at a point 39 on the vertical cylindrical surface 40 internal of oven 28, as shown in FIG. 5. Stock 22 will thus begin to flow at a 41.

Figure 6:
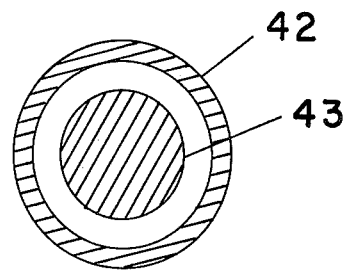
FIG. 6 is a transverse sectional view of some glass stock taken on the line 6—6 shown in FIG. 5.
Figure 7:
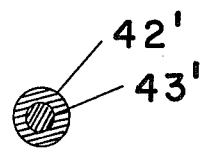
FIG. 7 is a transverse sectional view of a drawn glass fiber.
Figure 11:
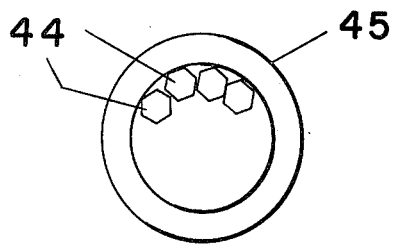
FIG. 11 is an end elevational view of fibers of FIG. 10 contained in a glass tube.
Figure 8:
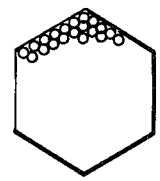
FIG. 8 is an end elevational view of a plurality of glass fibers.
Figure 9:
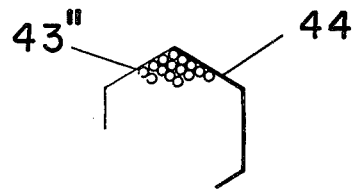
FIG. 9 is an end elevational view, greatly enlarged, of drawn glass fibers.

One use to which machine 20 may be put is illustrated in FIGS. 6 through 12. In FIG. 6, a hollow cylindrical stock 42 is drawn onto a solid cylindrical stock 43 as shown in FIG. 7. However, the space between stocks 42 and 43 shown in FIG. 6 is reduced to zero during the drawing process. The relative size of the stocks 42' and 43' shown in FIG. 7 will still remain the same. The fibers are then cut to about 12 inch lengths and loaded onto a hexagonal mold in the positions shown in FIG. 8. The fibers are then heated to bond them together. The hexagon is then again drawn down to a small fiber. Each fiber nevertheless retains its hexagonal shape. The transverse cross section of each fiber will then look as shown in FIG. 9, 44 indicating one complete fiber. The view of FIG. 9 is greatly enlarged for clarity. Only the glass 43" which has been drawn down from stock 43 in FIG. 6 will appear separate from the remainder of the glass.

Figure 10:
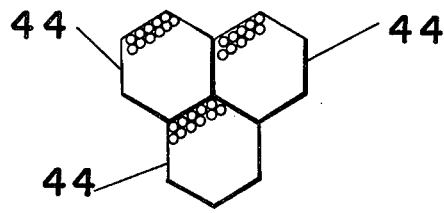
FIG. 10 is an end elevational view of three glass fibers.

A great many of the hexagonal fibers are then stacked together as shown in FIG. 10, the fibers being cut to, for example, 6 inch lengths. Due to the hexagonal shape of the fibers, they will fit close together and leave little or no gaps.

Figure 12:
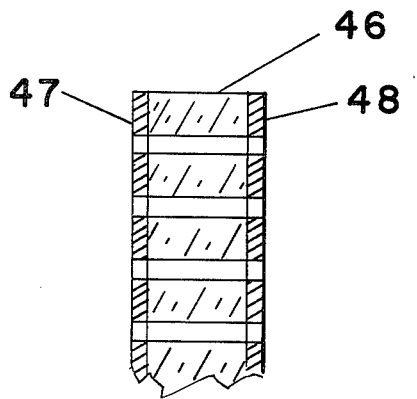
FIG. 12 is a sectional view of a wafer cut from the arrangement shown in FIG. 11.

The hexagonal fibers 44 are packed together and then heated with a glass tube 45 which is shrunk over the hexagonal fibers by the use of a vacuum. The glass tube 45 with the fibers securely fixed inside is then cut transverse to its axis several times to cut wafers therefrom. The core glass 43" is then etched out. The wafer then looks as indicated at 46 in FIG. 12. The wafer 46 is then fired in a hydrogen furnace to make the internal surface of the holes therethrough support secondary emission. When electrodes 47 and 48 are evaporated on wafer 46 as shown in FIG. 12, the construction may be used as a channel-type electron multiplier. The utility of channel-type electron multipliers is well known.

In the operation of the machine 20, stock 22 is fixed in chuck 23. Oven 28 is then run down to the position shown in FIG. 5, assembly 35 including a reversible motor. Oven 28 is then operated until glass drawing can begin. Assembly 35 is then actuated, and the motor therein drives oven 28 in an upward direction at a constant speed. Motor 27 is also simultaneously actuated to draw glass at 25 at a constant speed.

Although conventional constant speed motors may be employed in assembly 35 and for motor 27, the speeds of both motors may be coordinated by an automatic control if desired. It has been found more convenient to control oven movement and drawing speed independently until the rates thereof are more perfectly matched.

From the foregoing, it will be appreciated that oven 28 is relatively heavy and moved in an upward direction in the drawing operation. The sustained load throughout the driving connection is such that assembly 35 and oven 28 are, thus, continuously loaded so that oven 28 will not move upwardly in a jerky manner. This method and construction of machine 20, thus, permits the substantial increase in the drawing accuracy which was explained previously. That is, by keeping the speed of oven 28 absolutely constant, no substantial variation in drawn glass diameter takes place. In particular, machine 20 can draw glass to a diameter tolerance of ±0.00025 inch.

What is claimed is:

1. A glass fiber drawing machine comprising: a first rigid frame; support means to hold a body of glass in a vertical position rigid relative to said frame and with a free end extending downwardly; a hollow oven to heat said body; first reversible power means to move said oven upwardly around said free end; and second power means to draw glass downwardly from said free end, said support means including a chuck fixed to said frame to hold the upper end of said body, said body extending in a downward vertical direction from said chuck, said oven being cylindrical and having a bracket fixed thereto, said bracket having guide hole means and a threaded hole extending vertically therethrough, a guide rod in each of said guide hole means fixed to said frame, a lead screw meshed in said threaded hole and rotatable in a fixed vertical position on said frame about a vertical axis the same as its symmetrical axis, said first power means coupled to said lead screw to turn said lead screw at a constant velocity in a direction to cause said bracket to be raised, said oven being fixed to said bracket in a position to cause said oven to rise so that its hollow interior surrounds said body in a uniformly spaced relationship, the axes of said oven and said body being the same vertical axis, said second power means being adapted to draw glass at a constant rate from said body at a position therebelow on the axis thereof.

2. The invention as defined in claim 1, wherein said bracket includes two spaced vertical guide holes and two respective guide rods therein, said threaded hole being positioned between said guide holes, said first power means including a constant speed motor and gear train.

3. The invention as defined in claim 2, wherein said gear train includes a worm gear and worm, and said second power means is operable simultaneously with said first means and includes a second constant speed motor and a pair of rollers driven thereby.

* * * * *